July 9, 1940. S. H. JONES 2,207,406
COLLISON AND THEFT SIGNALING DEVICE
Filed Sept. 14, 1939
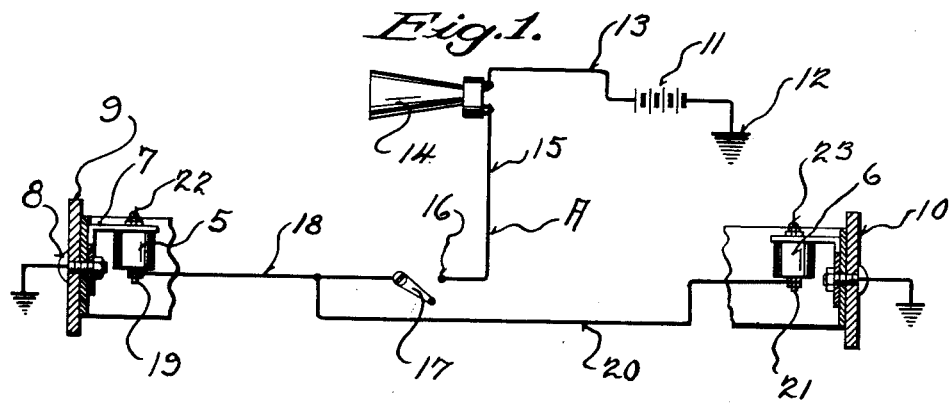
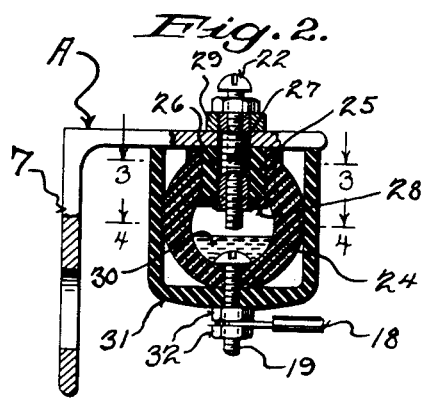 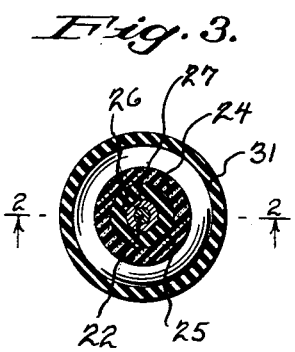
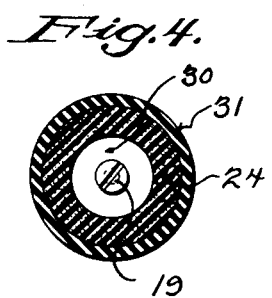
Inventor
S. H. Jones
By
Attorneys Patented July 9, 1940

2,207,406

UNITED STATES PATENT OFFICE 2,207,406

COLLISION AND THEFT SIGNALING DEVICE

Samuel H. Jones, West Allis, Wis.

Application September 14, 1939, Serial No. 294,864

1 Claim. (Cl. 200—52)

This invention appertains to motor vehicles, and more particularly to a collision and theft signaling device.

One of the primary objects of my invention is to provide a circuit-closing device located on the front and rear bumpers of an automobile, adapted to be set into operation for closing a circuit through a signal when the bumpers are struck, so that should the automobile be parked and left unattended and a parking automobile strikes the same, an alarm will be automatically given.

Another salient object of my invention is the provision of a circuit-closer on an automobile adapted to be operated by vibrations arranged in an alarm circuit with a manually controlled switch, whereby the owner of the vehicle, when leaving the same, can close the manually operated switch, so that if the vehicle is moved by unauthorized persons, the first switch will be actuated to cause the closing of the alarm circuit and the giving of a warning signal to prevent the theft of the vehicle.

A further important object of my invention is to provide novel means for constructing the automatic circuit-closers, whereby the same will be of an exceptionally strong and durable construction, and whereby the same can be manufactured at a low cost and protected against the elements.

With these and other objects in view, the invention consists in the novel construction, arrangement, and formation of parts, as will be hereinafter more specifically described, claimed, and illustrated in the accompanying drawing, in which drawing:

Figure 1 is a diagrammatic view illustrating my alarm circuit and showing the automatic circuit-closers incorporated with the front and rear bumpers of a motor vehicle, the bumpers being shown in transverse cross-section.

Figure 2 is an enlarged, detail, perspective view illustrating one of the novel circuit-closers and the supporting bracket therefor.

Figure 3 is a horizontal section taken on the line 3—3 of Figure 2, looking in the direction of the arrows.

Figure 4 is a view similar to Figure 3, with the section taken on the line 4—4 of Figure 2, looking in the direction of the arrows.

Referring to the drawing in detail, wherein similar reference characters designate corresponding parts throughout the several views, the letter A generally indicates my improved anti-theft and collision signaling apparatus, and, as illustrated, the same includes front and rear circuit-closers 5 and 6, which are adapted to be automatically operated by vibration, as will be later set forth.

These circuit-closers 5 and 6 are each of identical construction, and each is connected to a bracket 7. The brackets are bolted or otherwise fastened, as at 8, to the front and rear bumpers 9 and 10 of an automobile. The circuit-closers are incorporated in an alarm circuit, which includes a storage battery 11. This battery, as in the usual practice, is grounded, as at 12, to the frame of the vehicle, and the other terminal of the battery has connected thereto a wire 13, which leads to one terminal of a signal 14, which may be an electric horn. The other terminal of the horn 14 has connected thereto an electric conducting wire 15, which leads to one contact 16 of a manually controlled switch 17. The other contact or terminal of the switch 17 has connected thereto a conductor wire 18, which leads to one terminal 19 of the switch 5. The wire 18 also has electrically connected thereto a conductor wire 20, which leads to a terminal 21 of the circuit-closer 6, and this terminal 21 corresponds to the terminal 19 of the circuit-closer 5. The other terminals 22 and 23 of circuit-closers 5 and 6 are grounded to the bracket 7, and the brackets 7 are, in turn, grounded to the frame of the vehicle through the medium of the bolts 8.

Referring to the circuit-closers 5 and 6, it will be noted that each includes a hollow bulb 24, preferably formed from soft cushion rubber. This bulb 24 is provided with an entrance throat or neck 25. Fitted within the throat or neck 25 is a relatively soft cushion sleeve 26, which surrounds a threaded bolt 27. Fitted on the lower end of the bolt is a fibre or hard rubber disc 28, which engages the lower end of the sleeve 26 and the inner surface of the hollow bulb 24. The bolt 27 extends through the horizontal arm of the attaching bracket 8, and an adjusting nut 29 is threaded on the bolt for securely holding the bulb on the bracket and for adjusting the bolt 27, whereby to contract the sleeve 26 longitudinally and expand the same circumferentially into tight intimate contact with the wall of the neck or throat 25.

Arranged within the bulb is a predetermined quantity of mercury 30, and this mercury covers the contact 9. The contact 19 is anchored to the bulb and extends through the bulb and through the lower wall of a hard rubber protecting cup 31. Nuts 32 are threaded upon the contact 19 for securely holding the cup on the bulb, and the cup against the bracket. The nuts 32 also hold the conductor wire 18 in place.

The bolt 27 is provided with an internally threaded bore, which adjustably receives the contact 22. Obviously, by turning the contact, the same can be adjusted toward and away from the mercury 30. By regulating the distance of the inner end of the contact 22 from the mercury, the timing of the closing of the circuit through the signal 14 by various vibrations can be controlled.

In use of my improved device, should the vehicle be parked and the operator leaves the vehicle unattended, the switch 7 is manually operated so that the switch lever will engage the contact 16. If another car should strike the parked car, the shock will vibrate the circuit-closers 5 and 6, and the disturbance of the mercury 30 will cause the mercury to engage the contacts 22 and 23, and consequently close the circuit through the horn 14. The sounding of the horn 14 will call the owner's attention to the fact that his automobile has been struck.

Likewise, should unauthorized persons attempt to move the vehicle, the shaking of the vehicle will vibrate the mercury 30 and bring about the closing of the circuit and the sounding of the alarm.

I lay particular stress on the construction of my circuit-closers, as the same are of exceptionally simple and durable character, and the hard rubber shell 32 fully encloses and protects the soft rubber bulb 24 against injury and damage incident to the travel of the vehicle over the roadway.

Changes in details may be made wthout departing from the spirit or the scope of my invention, but what I claim as new is:

In a collision and theft indicating device for an automobile, a circuit-closer adapted to be actuated by the vibration of the vehicle including, a supporting bracket adapted to be secured to and electrically connected with the chassis of a vehicle, a cushion rubber bulb having an open throat, and a quantity of mercury in said bulb, a contact immersed in said mercury and carried by the bulb, a hard cup completely enclosing said bulb, means securing the cup to the contact, an attaching bolt, a rubber sleeve surrounding a part of the bolt, a disc of hard rubber carried by the inner end of the bolt engaging the sleeve, said sleeve and disc being fitted in the throat of the bolt, means for adjusting the bolt in the sleeve and for holding the bolt on the bracket, and an adjustable contact carried by said bolt movable toward and away from the mercury.

SAMUEL H. JONES.